United States Patent
Jakubowski et al.

(10) Patent No.: US 10,421,549 B2
(45) Date of Patent: Sep. 24, 2019

(54) FLIGHT PASSENGER SEATING DEVICE

(71) Applicant: RECARO Aircraft Seating GmbH & Co. KG, Schwaebisch Hall (DE)

(72) Inventors: Jens Jakubowski, Schwaebisch Gmuend (DE); Marsel Mejuhas, Schwaebisch Hall (DE); Anne Dobritz, Schwaebisch Hall (DE)

(73) Assignee: RECARO Aircraft Seating GmbH & Co. KG, Schwaebisch Hall (DE)

( * ) Notice: Subject to any disclaimer, the term of this patent is extended or adjusted under 35 U.S.C. 154(b) by 0 days.

(21) Appl. No.: 15/574,915

(22) PCT Filed: Apr. 4, 2016

(86) PCT No.: PCT/EP2016/057358
§ 371 (c)(1),
(2) Date: Nov. 17, 2017

(87) PCT Pub. No.: WO2016/184597
PCT Pub. Date: Nov. 24, 2016

(65) Prior Publication Data
US 2018/0162534 A1    Jun. 14, 2018

(30) Foreign Application Priority Data
May 20, 2015   (DE) ........................ 10 2015 107 988

(51) Int. Cl.
*B60J 3/02* (2006.01)
*B64D 11/06* (2006.01)
(Continued)

(52) U.S. Cl.
CPC .......... *B64D 11/0643* (2014.12); *B60N 2/995* (2018.02); *B64D 11/0647* (2014.12); *B60J 3/0204* (2013.01); *B60R 2011/0035* (2013.01)

(58) Field of Classification Search
None
See application file for complete search history.

(56) References Cited

U.S. PATENT DOCUMENTS

| | | | | |
|---|---|---|---|---|
| 4,113,311 A | * | 9/1978 | Reida ..................... | A47C 7/506 297/423.32 |
| 4,470,634 A | * | 9/1984 | Delius .................. | B60N 2/0292 297/423.19 |

(Continued)

FOREIGN PATENT DOCUMENTS

| DE | 698 00 184 T2 | 10/2000 |
|---|---|---|
| DE | 600 05 895 T2 | 8/2004 |

(Continued)

OTHER PUBLICATIONS

Search Report dated Apr. 21, 2016 issued in corresponding DE patent application No. 10 2015 107 988.7 (and partial English translation).

(Continued)

*Primary Examiner* — Kyle J. Walraed-Sullivan
(74) *Attorney, Agent, or Firm* — Posz Law Group, PLC

(57) ABSTRACT

A flight passenger seating device with a flight passenger seat has at least one seat bottom and at least one leg support module comprising a leg support element that is embodied at least partly movably with respect to the seat bottom, wherein the leg support module comprises at least two pivot bearing units and a linear bearing unit, by means of which the leg support element is supported movably with respect to the seat bottom.

15 Claims, 8 Drawing Sheets

Figure 1:
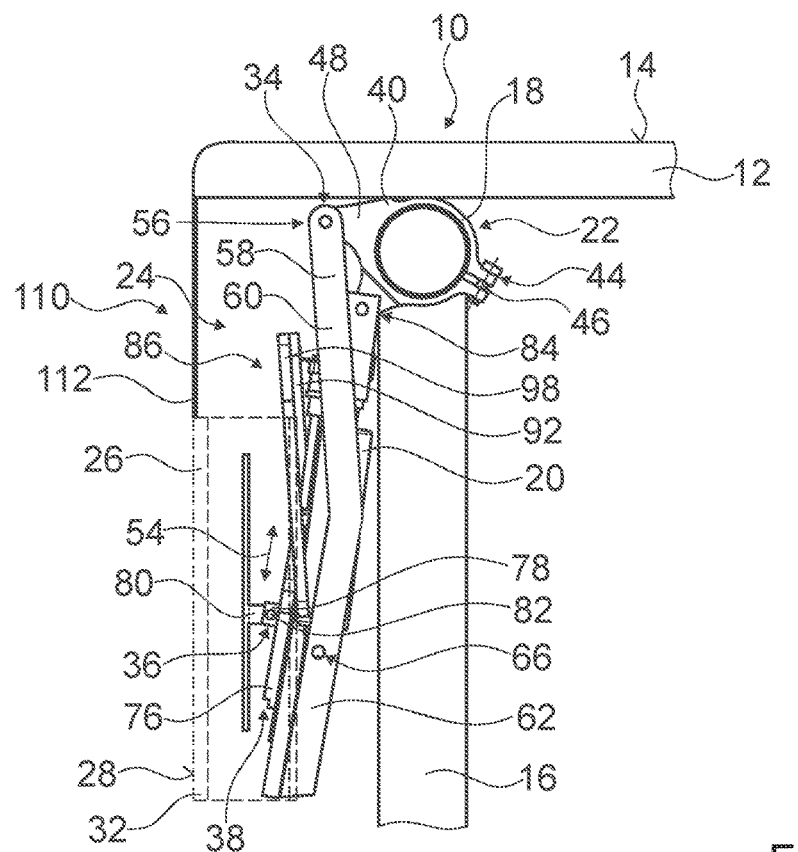

(51) Int. Cl.
*B60N 2/90* (2018.01)
*B60R 11/00* (2006.01)

(56) References Cited

U.S. PATENT DOCUMENTS

| | | | | |
|---|---|---|---|---|
| 4,509,795 A * | 4/1985 | Brennan | A47C 7/506 | 297/423.32 |
| 4,621,863 A * | 11/1986 | Jackson | A47C 1/0355 | 297/330 |
| 5,333,818 A * | 8/1994 | Brandt | B64D 11/06 | 244/118.6 |
| 5,352,020 A * | 10/1994 | Wade | B64D 11/0643 | 297/423.26 |
| 5,447,359 A * | 9/1995 | Asbjornsen | B60N 3/06 | 297/423.35 |
| 5,560,681 A * | 10/1996 | Dixon | B60N 2/4495 | 297/284.11 |
| 6,095,610 A * | 8/2000 | Okajima | B60N 2/995 | 297/423.36 |
| 6,412,870 B1 * | 7/2002 | Higgins | B60N 2/34 | 297/342 |
| 6,494,536 B2 * | 12/2002 | Plant | A47C 1/0352 | 297/284.11 |
| 6,659,562 B2 * | 12/2003 | Uchiyama | A47C 1/0242 | 297/217.3 |
| 6,669,143 B1 * | 12/2003 | Johnson | B64D 11/06 | 244/118.6 |
| 6,783,178 B2 * | 8/2004 | Kasahara | B64D 11/0641 | 297/217.3 |
| 6,902,238 B1 * | 6/2005 | Abt | B60N 2/0228 | 297/362.13 |
| 6,926,366 B2 * | 8/2005 | Wolters | A61G 13/12 | 297/423.36 |
| 6,959,966 B2 * | 11/2005 | Kristen | A47C 7/506 | 297/423.26 |
| 7,004,542 B2 * | 2/2006 | Saint-Jalmes | A47C 7/024 | 297/284.11 |
| 7,121,627 B2 * | 10/2006 | Gaikwad | A47C 7/506 | 297/423.36 |
| 7,156,462 B2 * | 1/2007 | Verny | B64D 11/06 | 297/354.12 |
| 7,213,882 B2 * | 5/2007 | Dryburgh | A47C 1/0352 | 297/354.13 |
| 7,229,134 B2 * | 6/2007 | Ito | B60N 2/0232 | 297/423.26 |
| 7,338,132 B2 * | 3/2008 | LaPointe | A47C 1/034 | 297/423.26 |
| 7,429,083 B2 * | 9/2008 | Tsuji | B60N 2/995 | 297/423.26 |
| 7,458,643 B2 * | 12/2008 | Johnson | B64D 11/0649 | 297/411.32 |
| 8,444,225 B2 * | 5/2013 | Behe | B64D 11/06 | 297/330 |
| 8,444,226 B2 * | 5/2013 | Driessen | B60N 2/4495 | 297/423.28 |
| 2002/0063449 A1 * | 5/2002 | Plant | B60N 2/34 | 297/68 |
| 2002/0070591 A1 * | 6/2002 | Nivet | B60N 2/0244 | 297/217.3 |
| 2002/0109390 A1 * | 8/2002 | Hagiike | B60N 2/0292 | 297/423.36 |
| 2003/0080597 A1 * | 5/2003 | Beroth | A47C 1/0352 | 297/330 |
| 2003/0209933 A1 * | 11/2003 | Flory | B60N 2/995 | 297/423.36 |
| 2004/0080201 A1 * | 4/2004 | Verny | B64D 11/06 | 297/354.13 |
| 2004/0100137 A1 * | 5/2004 | Johnson | B64D 11/0015 | 297/423.26 |
| 2005/0173948 A1 * | 8/2005 | Boehmer | B60N 2/995 | 297/69 |
| 2005/0173963 A1 * | 8/2005 | Edrich | B60N 2/62 | 297/423.28 |
| 2006/0186721 A1 * | 8/2006 | Flory | B60N 2/995 | 297/423.36 |
| 2008/0009989 A1 * | 1/2008 | Kim | B60N 2/0232 | 701/36 |
| 2010/0244534 A1 * | 9/2010 | Driessen | B60N 2/4495 | 297/423.35 |
| 2010/0253129 A1 * | 10/2010 | Dowty | B64D 11/064 | 297/85 M |
| 2011/0215200 A1 * | 9/2011 | Mejuhas | B60N 2/62 | 244/118.6 |
| 2011/0226900 A1 * | 9/2011 | Bamford | B60N 3/004 | 244/118.6 |
| 2011/0240797 A1 * | 10/2011 | Behe | B64D 11/06 | 244/122 R |
| 2011/0282495 A1 * | 11/2011 | Fischer | B60N 2/0224 | 700/275 |
| 2012/0228919 A1 * | 9/2012 | Dowty | B64D 11/064 | 297/85 M |
| 2013/0313867 A1 * | 11/2013 | Kuno | B60N 2/62 | 297/83 |
| 2015/0108817 A1 * | 4/2015 | Meister | B64D 11/0648 | 297/423.26 |
| 2015/0137790 A1 * | 5/2015 | Piaulet | B60N 2/995 | 324/71.1 |
| 2015/0284092 A1 * | 10/2015 | Wilkey | B60N 2/919 | 297/423.29 |
| 2015/0289655 A1 * | 10/2015 | Lawson | A47C 1/0342 | 297/75 |
| 2015/0375865 A1 * | 12/2015 | Fischer | B60N 2/919 | 701/49 |
| 2016/0302574 A1 * | 10/2016 | Brandhuber | A47C 1/0352 | |
| 2016/0331609 A1 * | 11/2016 | Cheng | B60N 3/063 | |
| 2017/0174105 A1 * | 6/2017 | An | B60N 2/995 | |

FOREIGN PATENT DOCUMENTS

| | | |
|---|---|---|
| DE | 10 2004 005 203 A1 | 8/2005 |
| DE | 601 17 924 T2 | 10/2006 |
| EP | 1 564 139 A2 | 8/2005 |
| WO | 98/36967 A1 | 8/1998 |

OTHER PUBLICATIONS

International Search Report of the International Searching Authority dated Jun. 17, 2016 issued in corresponding International Patent Application No. PCT/EP2016/057358.

International Preliminary Report on Patentability dated May 10, 2017 issued in corresponding International Patent Application No. PCT/EP2016/057358 (and German version with Article 34 amendments).

* cited by examiner

FLIGHT PASSENGER SEATING DEVICE

CROSS REFERENCE TO RELATED APPLICATIONS

This application is a U.S. national stage application of PCT/EP2016/057358 filed on Apr. 4, 2016, which is based on German Patent Application No. 10 2015 107 988.7 filed on May 20, 2015, the contents of which are incorporated herein by reference.

STATE OF THE ART

The invention relates to a flight passenger seating device according to the preamble of patent claim 1.

A flight passenger device has already been proposed, with a flight passenger seat which has at least one seat bottom and at least one leg support module comprising a leg support element that is embodied in such a way that it is implemented at least partly movable with respect to the seat bottom.

The objective of the invention is in particular to provide a generic device having improved characteristics as regards a passenger's comfort. The objective is achieved, according to the invention, by the features of patent claim 1, while advantageous implementations and further developments of the invention may be gathered from the subclaims.

Advantages of the Invention

The invention is based on a flight passenger seating device with a flight passenger seat which has at least one seat bottom and at least one leg support module comprising a leg support element that is embodied at least partly movable with respect to the seat bottom.

It is proposed that the leg support module comprises at least two pivot bearing units and a linear bearing unit, by means of which the leg support element is supported movably with respect to the seat bottom. By a "flight passenger seat" is herein in particular a seat to be understood which is mounted in an airplane cabin of an airplane. The flight passenger seat is herein preferably implemented as part of of several flight passenger seats which are arranged side by side. The flight passenger seat herein in particular comprises at least one seat bottom implementing a seating area for a passenger, a backrest providing a backrest support surface allowing a passenger sitting on the flight passenger seat to support himself with his back, and at least one armrest allowing the passenger to at least partly rest his arm on it. By a "seat bottom" is herein in particular a portion of a flight passenger seat to be understood which provides a seating area allowing a passenger to sit on, in particular during a flight, the seat bottom preferably comprising at least one base body as well as a cushioning element arranged on the base body. By a "leg support module" is herein in particular a module to be understood comprising at least one leg support element and at least a bearing of said leg support element, by means of which the leg support module is fixable, in particular fixable to the flight passenger seat. "At least substantially movably" is in particular to mean that an element, e.g. in particular the leg support module, is movable via its support at least in a defined region. By a "leg support element" is herein in particular an element to be understood providing a support surface that is configured to allow a passenger sitting on the flight passenger seat, in at least one position of the leg support element, to rest his leg and/or his foot on it. Herein the leg support element preferably comprises a cushioning element which implements the support surface. By a "pivot bearing unit" is herein in particular a bearing unit to be understood comprising at least one rotational axis about which the at least two elements, which are pivotally coupled with one another by means of the pivot bearing unit, are rotatable with respect to one another. By a "linear bearing unit" is herein in particular a bearing unit to be understood comprising at least one translational axis with respect to which the at least two elements, which are displaceably coupled with one another by means of the linear bearing unit, are displaceable with respect to one another. "Supported . . . movably with respect to the seat bottom" is herein in particular to mean that an element, e.g. in particular the leg support element, is movable with respect to the seat bottom, wherein the leg support element may herein be connected to any element of the flight passenger seat and does not need to be connected to the seat bottom directly. "Configured" is in particular to mean specifically programmed, designed and/or equipped. By an object being configured for a certain function is in particular to be understood that the object fulfills and/or implements said certain function in at least one application state and/or operating state. An implementation according to the invention allows a passenger bringing the leg support element of the leg support module into a position that is comfortable for him in an especially advantageous fashion. In this way it is possible to provide a flight passenger seating device according to the invention, featuring an especially high degree of comfort for a passenger sitting on the flight passenger seat that comprises the flight passenger seating device.

It is further proposed that the leg support module is mounted to the flight passenger seat directly. "Mounted directly" is herein in particular to mean that the leg support module is directly mounted to a portion of the flight passenger seat or to a structure encompassing the flight passenger seat, the leg support module providing with its leg support element a support surface for a leg and/or for a foot for said passenger. Herein the leg support module is in particular not connected to any other module in the airplane, in particular not to a rear side of a further flight passenger seat that is arranged, in a flight direction, in front of the flight passenger seat which the respective leg support module is allocated to. This allows connecting the leg support module in an especially advantageous manner.

It is furthermore proposed that the flight passenger seat comprises at least one base structure which the leg support module is mounted on. By a "base structure of the flight passenger seat'" is herein in particular a supporting structure of the flight passenger seat to be understood. Herein any structural components of the flight passenger seat via which a force can be transferred into a mounting unit of the flight passenger seat are part of the base structure. Herein in particular a transversal front tube, a transversal rear tube, a seat divider and/or a seat bottom are to be understood as part of the base structure of the flight passenger seat. In this way the leg support module is especially advantageously mountable onto the flight passenger seat.

It is also proposed that the flight passenger seat comprises a transverse element, which the leg support module is connected to. By a "transverse element" is herein in particular an element to be understood which extends in a transverse direction of the flight passenger seat, which transverse direction is oriented orthogonally to a sitting direction of the seat. The transverse element is herein preferentially embodied as a frontal transverse element extending in a transverse direction at an end of the seat that is a front end of the seat when viewed in the sitting direction.

Herein the transverse element is preferably embodied as a frontal support tube. It is herein principally also conceivable that the frontal transverse element is embodied as a different structural component of the flight passenger seat, which is arranged on a front end of the seat, e.g. a seat bottom. In this way the leg support module is connectable to the flight passenger seat in a particularly simple manner.

It is moreover proposed that the leg support module comprises a cover unit, which in at least one operating state covers a region between the seat bottom and the leg support element. By a "cover unit" is herein in particular a unit to be understood which comprises at least one planar element that is configured to cover a certain region and to provide a passenger with a support surface which the passenger may support himself on with portions of his legs. In particular in an operating state in which the leg support element is arranged spaced apart from the seat bottom, this advantageously allows spanning over a region between the seat bottom and the leg support element, thus providing a support surface for a leg of a passenger sitting on the flight passenger seat.

Beyond this, it is proposed that the cover unit comprises at least one fabric or leather element, which in the at least one operating state covers the region between the seat bottom and the leg support element. By a "fabric or leather element" is herein in particular a planar element to be understood, which is made of a fabric or of a leather, preferably in particular of a net, and which is preferably embodied in such a way that it is elastically stretchable. Principally it is also conceivable that the textile or leather element is embodied as part of an unrollable roller shutter system, which can be rolled up on a roll, depending on a distance between the seat bottom and the leg support element. Principally it is also conceivable that the fabric or leather element is embodied as part of a folding system, which is folded in a kind of accordion system and is connected in itself by an elastic band and can thus be lengthened by pulling apart and which moves back into its original position via the elastic band. This allows implementing the cover unit in a particularly simple manner.

It is also proposed that the leg support element is traversable via the linear bearing unit by at least 50 mm. "By at least 50 mm" is herein in particular to mean that the linear bearing unit is traversable by at least 50 mm, preferably by at least 100 mm and, in a particularly advantageous implementation, by at least 150 mm. In this way the leg support element is adjustable into a variety of positions in an advantageously flexible manner.

Furthermore it is proposed that the leg support module comprises at least one reset mechanism, which is configured for an automatic reset movement of the leg support element out of a deployed position. By a "reset mechanism" is herein in particular a mechanism to be understood which comprises at least one lever element and is configured to convert a movement of a first element into a second movement of a further element, which second movement depends on the movement of the first element. By an "automatic reset movement" is herein in particular to be understood that, in a pivot movement out of a deployed state back into its stowage position, the leg support element assumes a correct position and orientation for the stowage position automatically, without additional adjusting movements of a passenger. In the automatic reset movement the linear bearing unit is herein preferably displaced, from a position in which it is displaced out of the minimum position, back into the minimum position. Principally it is also conceivable that the second pivot bearing unit is in the automatic reset movement set back into a neutral position by the reset mechanism. This allows bringing the leg support module into a stowage position in a particularly simple fashion.

It is also proposed that the reset mechanism is configured to reset an adjustment of the linear bearing unit. An "adjustment of the linear bearing unit" is herein in particular to mean a displacement of the linear bearing unit out of a minimum position. This allows implementing the reset unit in a particularly simple fashion.

Beyond this it is proposed that the reset mechanism comprises at least one guiding element, which implements at least one guiding track that differs from a straight line. By a "guiding element" is herein preferably an element to be understood which is configured, in a movement of the element relative to another element, to guide the other element in a defined fashion. The guiding element is herein preferably embodied as a groove, wherein it is principally also conceivable that the guiding element is embodied as a guiding rail or as an elevation. By a "guiding track that differs from a straight line" is herein in particular a guiding track to be understood which is preferentially implemented in a shape of a circular track but may also be embodied in an ellipse shape. This allows implementing the reset mechanism for an automatic reset movement in an especially simple manner.

It is moreover proposed that the reset mechanism comprises at least one lever element, which comprises a bearing axis that is displaced in parallel to a pivot axis of the first pivot bearing unit. This advantageously allows achieving a relative movement between the parts of the reset mechanism and parts of the leg support module, by means of which the automatic reset movement may be generated in a simple manner.

Furthermore it is proposed that the reset mechanism comprises at least one lever element featuring a bearing that is embodied as a wobble bearing. By a "wobble bearing" is herein in particular a bearing to be understood comprising an inner bearing element and an outer bearing element that is supported on the inner bearing element in such a way that it is rotatable about a bearing axis wherein, in a rotation relative to the inner bearing element, the outer bearing element is tilted with respect to the inner bearing element. As a result of this, the lever element is advantageously capable of compensating movements that are parallel to a pivot axis of its bearing.

It is also proposed that the reset mechanism is in at least one position configured for blocking the linear bearing unit. This advantageously allows preventing the leg support element from being adjustable in a stowage position via the linear bearing unit.

Moreover it is proposed that the leg support module comprises only one actuator, which is configured for adjusting the leg support element. By an "actuator" is herein in particular an element to be understood which is, at least in an actuated state, capable of providing an actuation force. Herein the actuator is preferably implemented as a gas compression spring. In this way the leg support module may be embodied in a simple and cost-effective fashion.

It is also proposed that the leg support module is connected centrally underneath the seat bottom. "Centrally underneath the seat bottom" is herein to mean that a distance between the connection of the leg support module to the flight passenger seat and the one side of the seat bottom is the same as the distance between the connection and the opposite side of the seat bottom. This allows mounting the leg support module to the flight passenger seat in a particularly advantageous fashion.

Beyond this it is proposed that the leg support module comprises at least one life-vest container, which is at least partly integrated in the leg support module. By a "life-vest container" is herein in particular a container to be understood which at least substantially encloses a space in which a life-vest, e.g. in particular a swim vest, is stored and is easily retrievable if required. The life-vest container herein preferably has an opening, which is preferentially closable via at least one closure element, the life-vest being retrievable out of the life-vest container, in an open state of the closure element, via the opening. Herein the life-vest container preferably comprises a securing element, which is embodied as a seal and is configured to be destroyed on opening the life-vest container, to allow identifying possible manipulation of the life-vest container. The closure element is herein preferably embodied as a pivotable flap. Principally closure elements for closing the life-vest container are also conceivable, which are movable in a different manner. This allows implementing the leg support module in an especially advantageous manner.

It is further proposed that the leg support element is connected to the transverse element off-center with respect to the seat bottom. "Connected off-center" is herein in particular to mean that the at least one element for connecting the leg support element to the transverse element is arranged, viewed in a transverse direction, spaced apart from a center of the leg support element. Herein the elements for connection, like in particular the linear bearing unit and/or the pivot bearing units, are preferably arranged only in one half of the leg support element, wherein the opposite-situated half is free of the linear bearing unit and/or the pivot bearing units, and preferentially other elements, e.g. in particular the life-vest container, are arranged in the half of the leg support element that is situated opposite the linear bearing unit and/or the pivot bearing units. In this way it is especially advantageously possible to provide a region in which the life-vest container is advantageously and simply arrangeable.

It is moreover proposed that the linear bearing unit comprises at least two parallel-running guidances. This allows achieving a particularly advantageous stability for the linear bearing unit that is located off-center, and thus in particular allows preventing a canting.

The flight passenger seating device according to the invention is herein not to be limited to the application and implementation form described above. In particular, the flight passenger seating device according to the invention may, to fulfill a functionality herein described, a number of respective elements, structural components and units that differs from a number herein mentioned.

DRAWINGS

Further advantages will become apparent from the following description of the drawings. In the drawings two exemplary embodiments of the invention are shown. The drawings, the description and the claims contain a plurality of features in combination. Someone skilled in the art will purposefully also consider the features separately and will find further expedient combinations.

Figure 2:
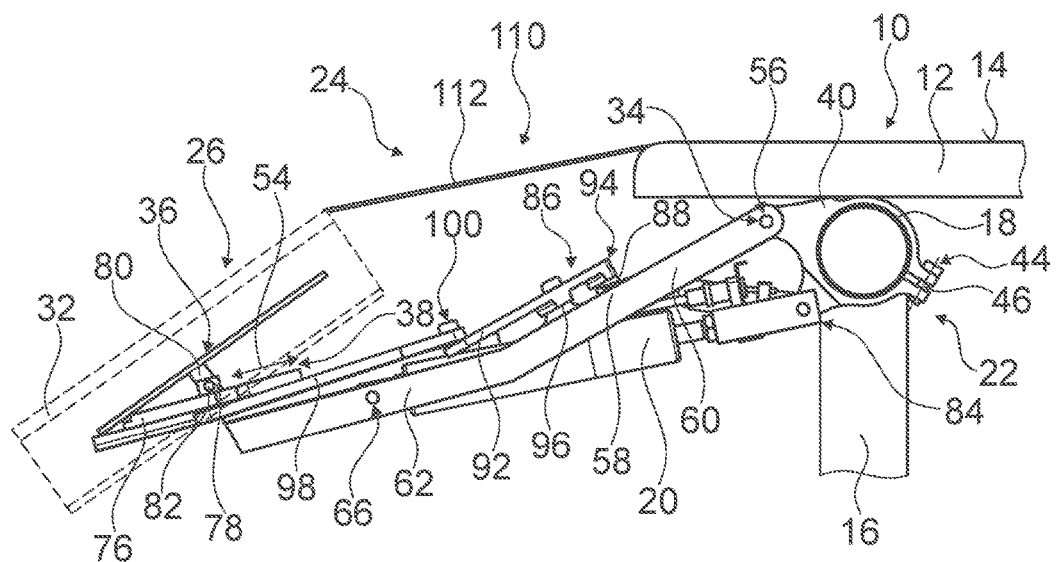
Figure 3:
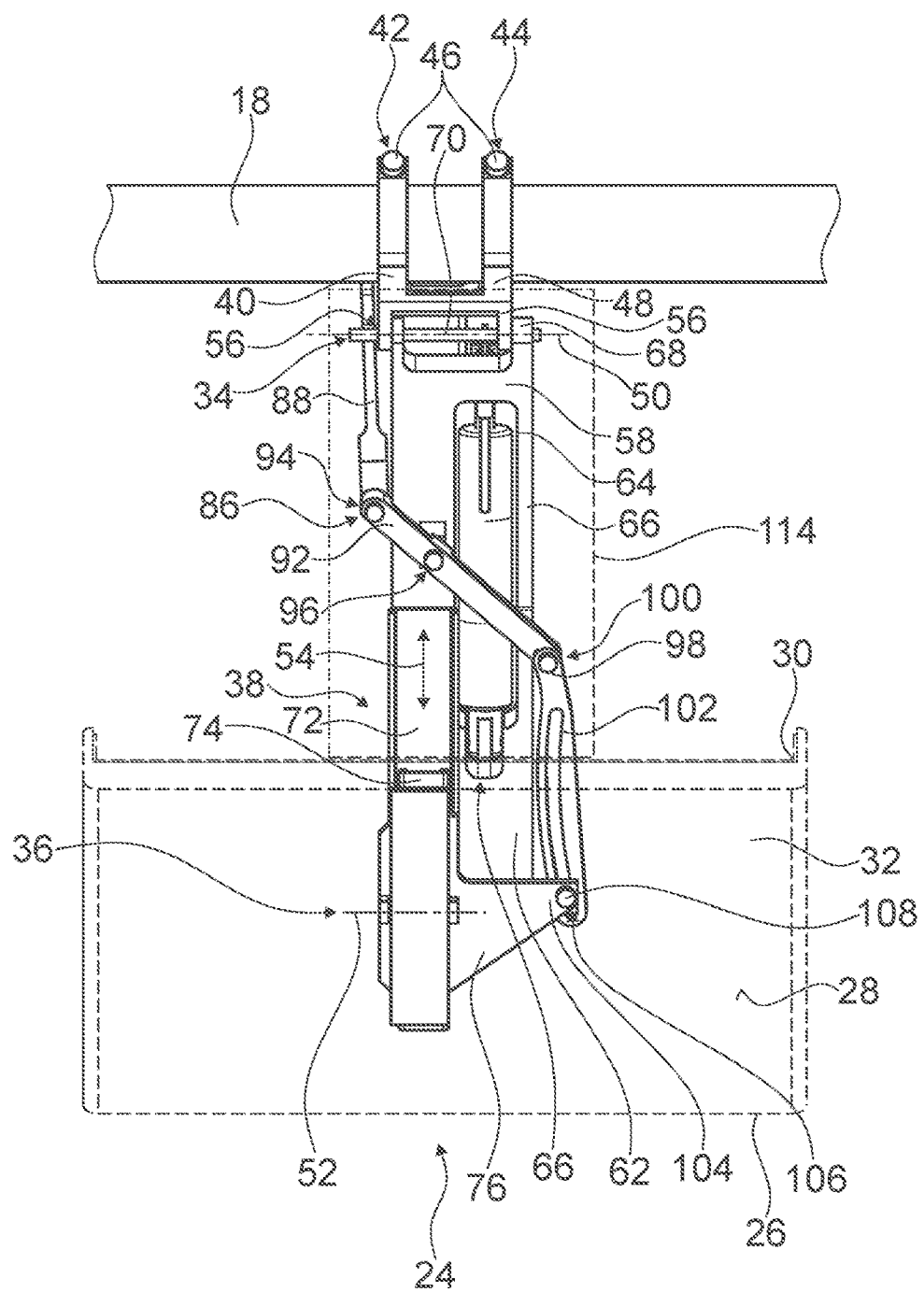
Figure 4:
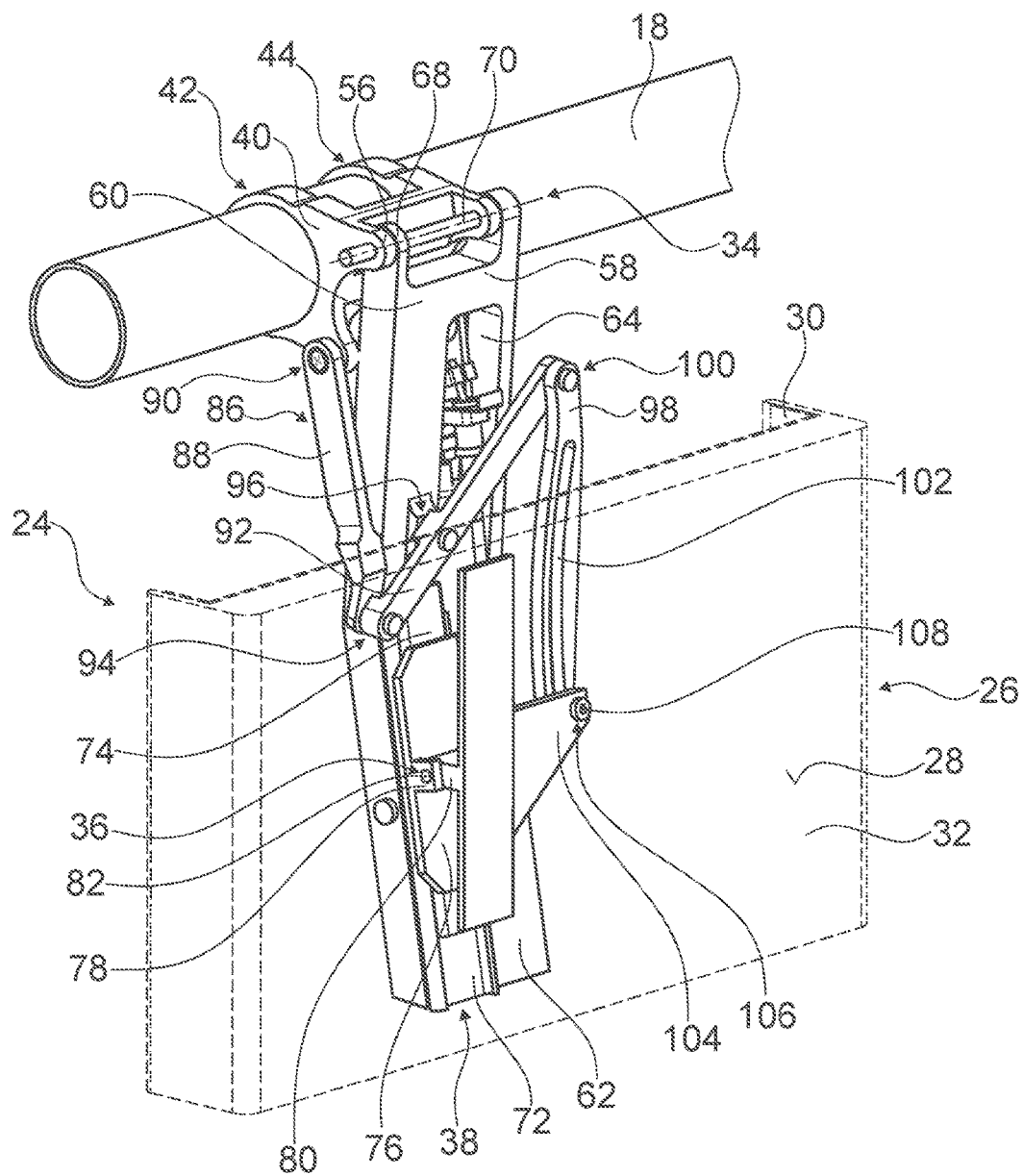
Figure 5:
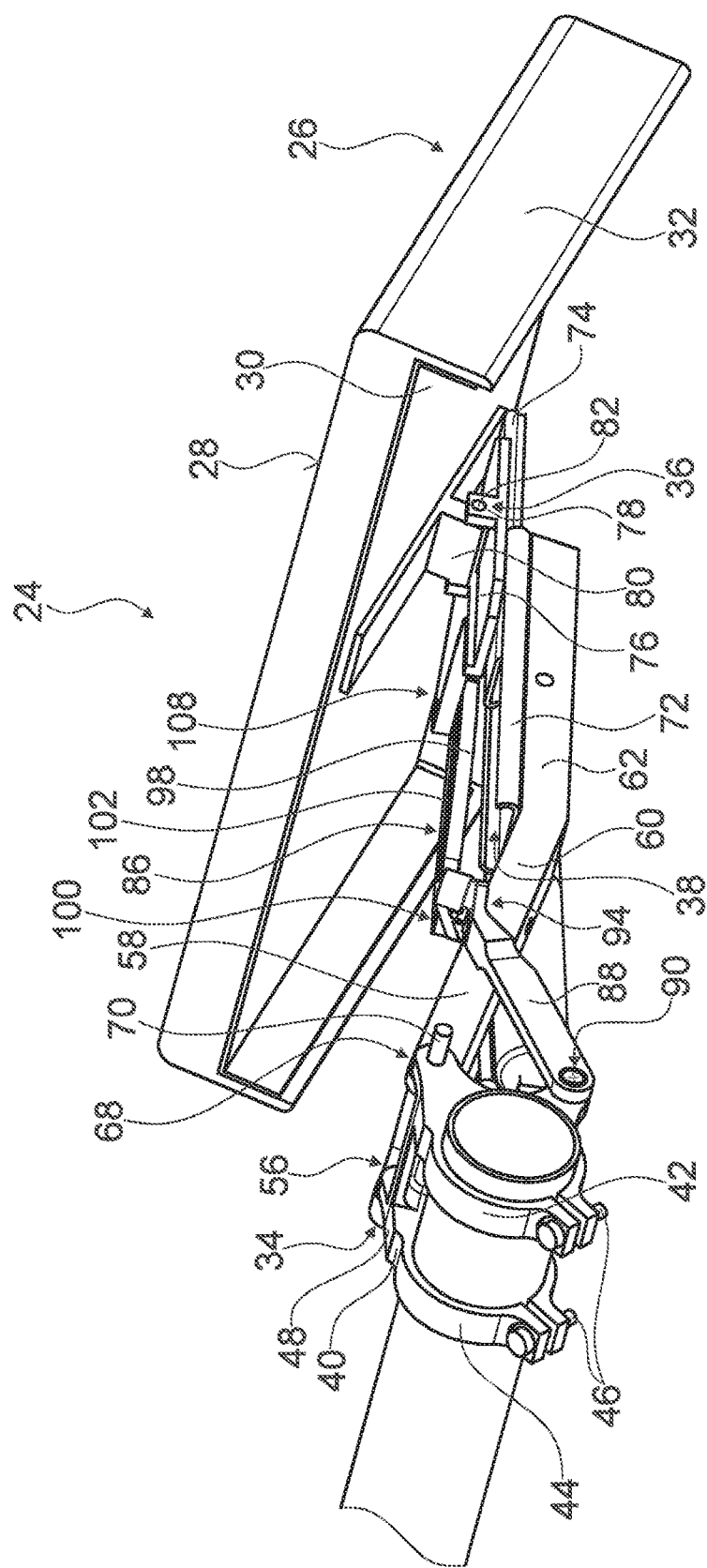
Figure 6:
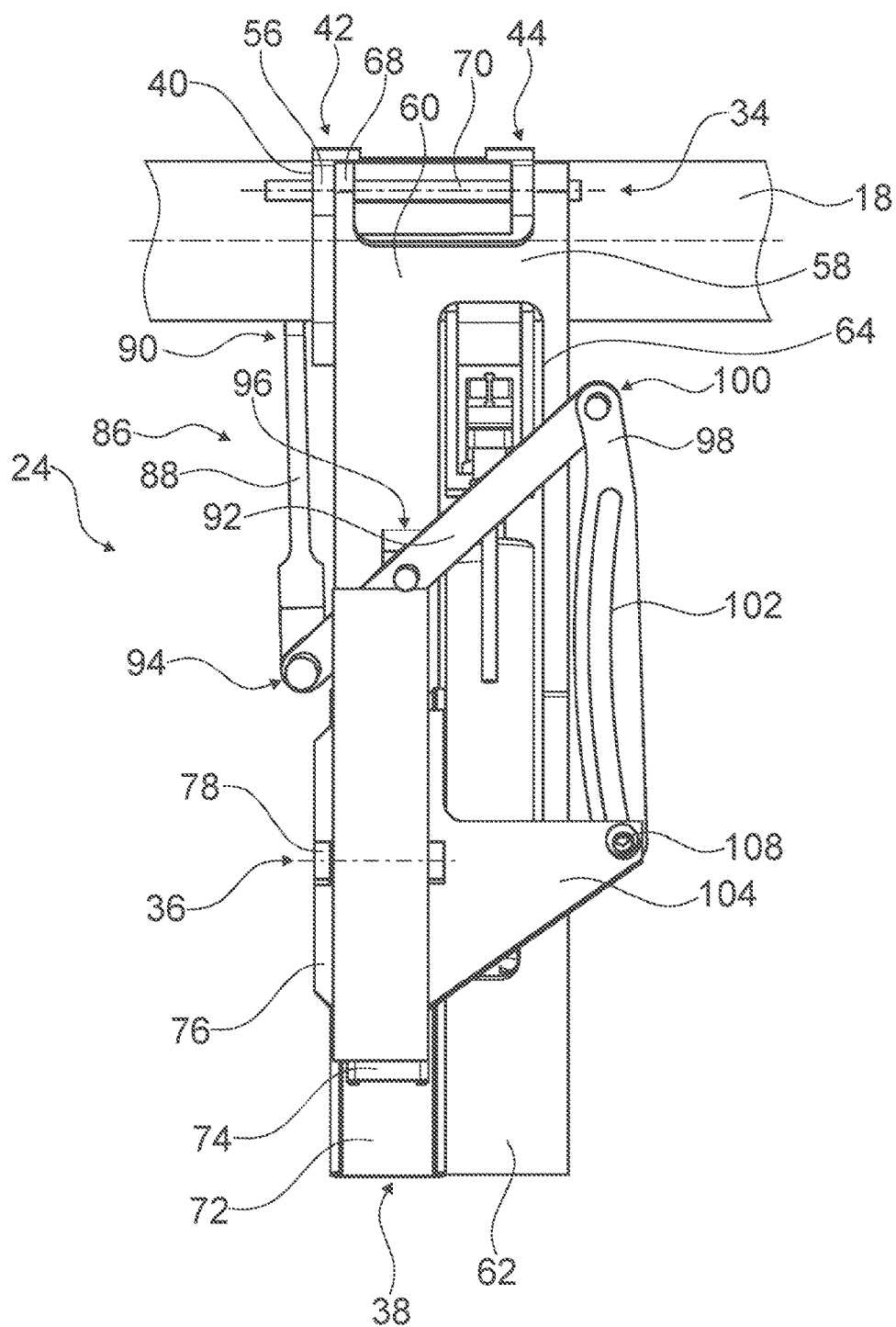
Figure 7:
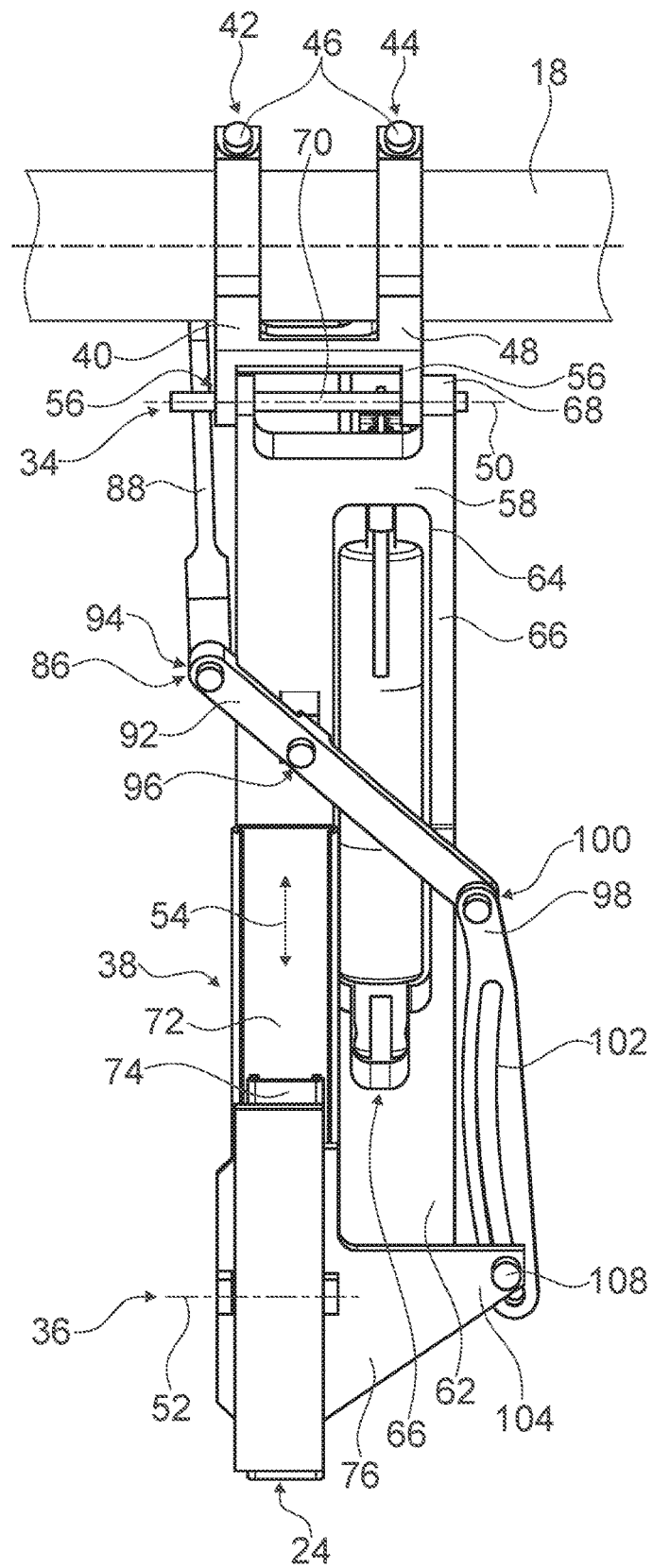
Figure 8:
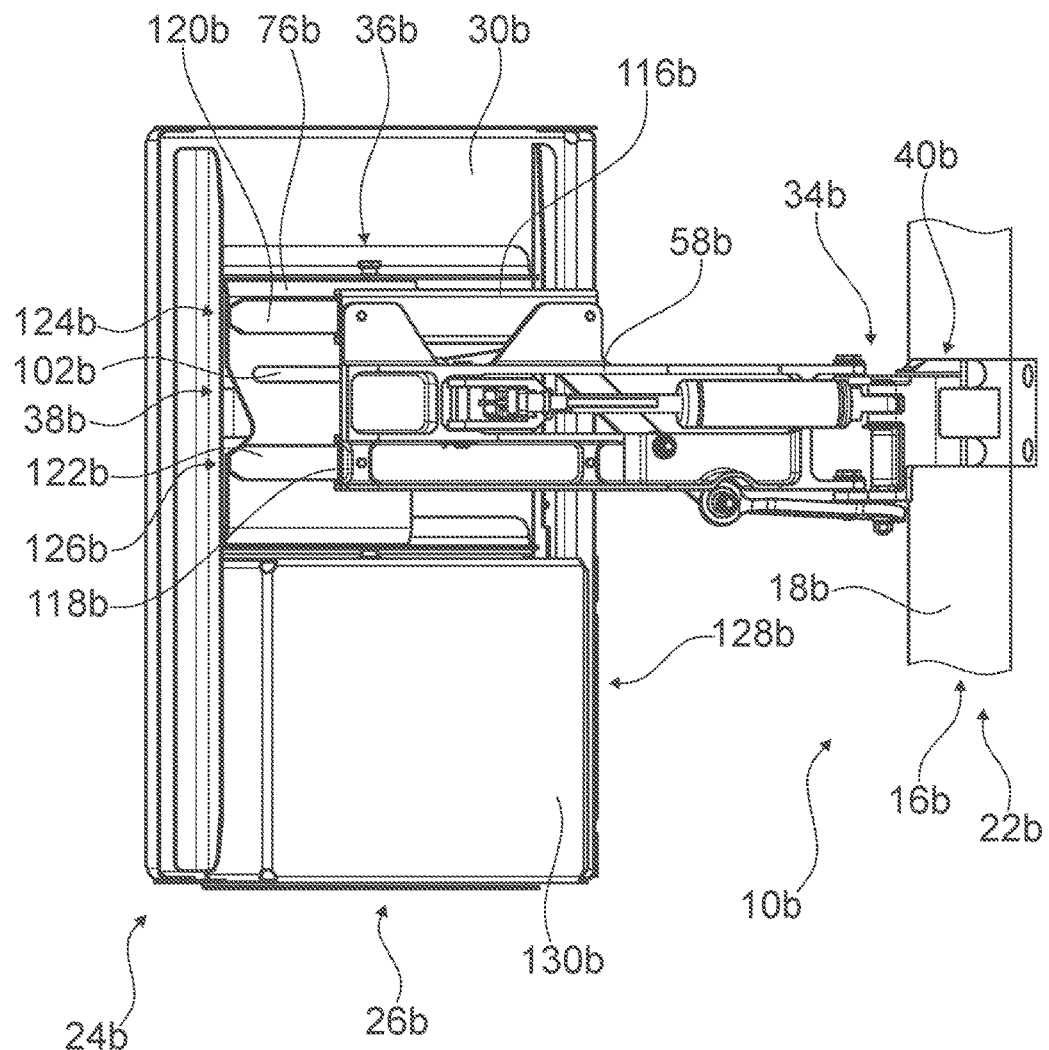
Figure 9:
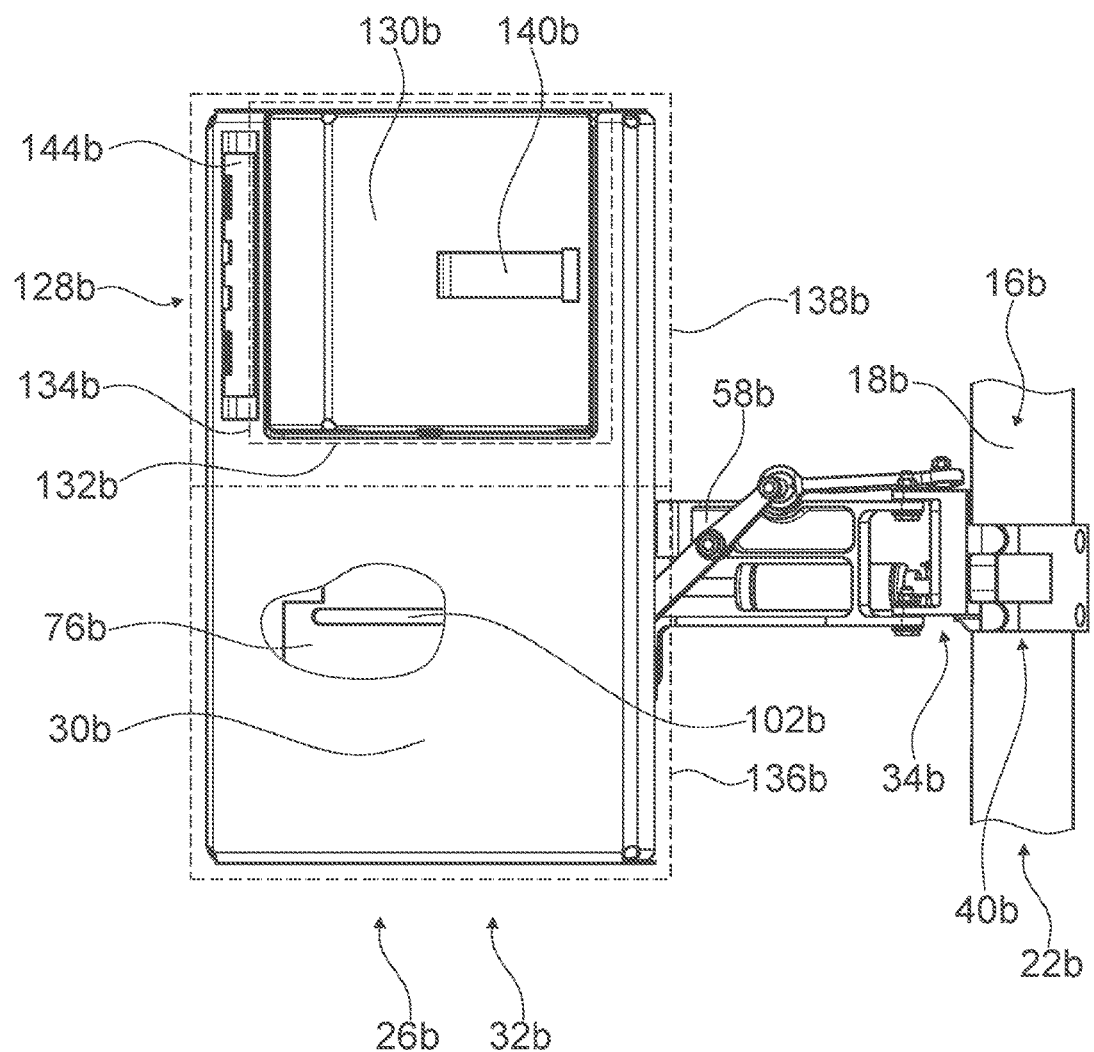

It is shown in:

FIG. 1 a schematic presentation of a flight passenger seating device according to the invention in a first exemplary embodiment, with a portion of a flight passenger seat and a leg support module, in a stowage position, FIG. 2 a schematic presentation of the flight passenger seat device and the leg support module in a deployed usage position, with a leg support element, FIG. 3 a schematic presentation of the leg support module with a reset mechanism and the leg support element, FIG. 4 a further schematic presentation of the leg support module and the leg support element, from the front, FIG. 5 a schematic presentation of the leg support module from the rear, FIG. 6 a schematic presentation of pivot bearing units, a linear bearing unit and the reset mechanism of the leg support module in a stowage position, FIG. 7 a schematic presentation of the pivot bearing units, the linear bearing unit and the reset mechanism of the leg support module in a usage position, FIG. 8 a schematic presentation of a flight passenger seating device according to the invention in a second exemplary embodiment, with a portion of a flight passenger seat and a leg support module and a life-vest container, and FIG. 9 a schematic presentation of the leg support module with the life-vest container.

DESCRIPTION OF THE EXEMPLARY EMBODIMENTS

FIGS. 1 to 7 show a flight passenger seating device according to the invention in a first exemplary embodiment. The flight passenger seating device comprises a flight passenger seat 10. The flight passenger seat 10 comprises a seat bottom 12 providing a seat surface 14 for a passenger. The flight passenger seat 10 is mounted in an airplane cabin. For this purpose the flight passenger seat 10 comprises a mounting unit 16. By means of the mounting unit 16 the flight passenger seat 10 is fixedly arranged on a cabin floor of the airplane cabin. The flight passenger seat 10 comprises a first frontal transverse element 18 and a second rear transverse element. The transverse elements 18 are embodied as support tubes. The flight passenger seat 10 is herein implemented as part of a seat row (not shown in detail). The seat row comprises in the present case three flight passenger seats 10, which are arranged side by side. The transverse elements 18 extend transversely underneath the flight passenger seats 10 of the seat row. Principally it is also conceivable that the seat row comprises a different number of flight passenger seats 10 or that it is embodied as a single seat. The flight passenger seat 10 comprises a base structure 22. The two transverse elements 18, the mounting unit 16 and the seat bottom 12 are part of the base structure 22.

The flight passenger seat 10 comprises a leg support module 24. The leg support module 24 is configured to allow a passenger sitting on the flight passenger seat 10 to lay his legs and/or feet on it. The leg support module 24 is directly connected to the base structure 22 of the flight passenger seat 10. Herein the leg support module 24 is mounted on the frontal transverse element 18 of the base structure 22. The leg support module 24 comprises a leg support element 26. Principally it is also conceivable that the leg support module 24 comprises a plurality of leg support elements 26. The leg support element 26 implements a support surface 28, which is configured to allow a passenger sitting on the flight passenger seat 10 to lay his leg and/or his foot on it. The leg support element 26 comprises a base body 30 and a cushioning element 32 that is connected to the base body 30. The cushioning element 32 implements the support surface 28 of the leg support element 26. Herein the cushioning element 32 comprises an exchangeable cover, which is not shown in detail. Principally it is also conceivable that the cushioning element 32 does not comprise a cover. Herein the cushioning element 32, which implements the support surface 22, has an ergonomic shape, allowing a passenger to lay his leg thereon in an especially comfortable fashion. The base body 30 is herein implemented, for example, of a metal sheet or of a fiber composite material. Principally it is also conceivable that the leg support element 26 is merely implemented by a base body and a cover or by a combination of a cover and a cushioning element.

The leg support element 26 is implemented in such a way that it is partly movable with respect to the seat bottom 12 of the flight passenger seat 10. The leg support element 26 is pivotable and displaceable with respect to the seat bottom 12 in a variety of positions. The leg support element 26 is herein movable into the various positions by a passenger sitting on the flight passenger seat 10 via pure muscle force. The leg support element 26 herein comprises a first maximum position and a second maximum position. The leg support element 26 is continuously adjustable between the two maximum positions. The first maximum position is implemented as a stowage position. In the first maximum position, which is implemented as a stowage position, the leg support element 26 is oriented with its support surface 28 substantially orthogonally to the seat surface 14 of the seat bottom 12 and is arranged below the seat bottom 12. Herein the leg support element 26 is arranged between an underside of the seat bottom 12 and the cabin floor. The leg support element 26 is pivotable about a first pivot axis 50 which runs in parallel to the transverse element 18 out of the first maximum position, and is implemented as a stowage position. Herein the leg support element 26 is pivotable out of the first maximum position, which is implemented as a stowage position, frontwards, in front of the seat bottom 12 of the flight passenger seat 10. A second maximum position is implemented as a maximally deployed usage position. In the second maximum position the leg support element 26 is maximally pivoted, with respect to the seat bottom 12, out of the stowage position and is arranged substantially at the same level as the seat bottom 12. In the second maximum position the leg support element 26 may be oriented with its support surface 28 in parallel to the seat surface 14 of the seat bottom 12.

For adjusting the leg support element 26, the leg support module 24 comprises two pivot bearing units 34, 36 and a linear bearing unit 38. The first pivot bearing unit 34 is configured for pivoting the leg support element 26 with respect to the transverse element 18. For this purpose the pivot bearing unit 34 is arranged directly on the transverse element 18. The first pivot bearing unit 34 comprises a pivot axis 50, about which the leg support element 26 is pivotable and which is oriented in parallel to a middle axis of the transverse element 18. The second pivot bearing unit 36 is arranged spaced apart from the first pivot bearing unit 34. The second pivot bearing unit 36 is configured for adjusting an orientation of the leg support element 26 with respect to the seat bottom 12. Via the second pivot bearing unit 36, the leg support element 26 is tiltable with respect to the seat surface 14 of the seat bottom 12. The second pivot bearing unit 36 comprises a pivot axis 52, which is oriented parallel to the pivot axis 50 of the first pivot bearing unit 34. Principally it is also conceivable that the pivot axis 52 of the second pivot bearing unit 36 is slightly rotated with respect to the pivot axis 50 of the first pivot bearing unit 34. The second pivot bearing unit 36 is embodied as a friction bearing or a latch bearing, allowing a variety of positions to be securely held by the second pivot bearing unit 36. If the second pivot bearing unit 36 is embodied, for example, as a friction bearing, friction elements contacting each other would increase a friction coefficient between bearing elements which are rotatable with respect to each other, as a result of which said bearing elements would remain in a current position with respect to each other until a certain adjusting force is reached. If the second pivot bearing unit 36 is embodied, for example, as a latch bearing, it comprises, on each of two bearing elements which are rotatable with respect to each other, a plurality of latch elements latching into one another in a variety of positions, resulting in stable rotational positions. The two pivot bearing units 34, 36 implement two rotational points which are offset to each other in parallel. The linear bearing unit 38 is configured for adjusting a distance of the leg support element 26 to the seat bottom 12. For this purpose the linear bearing unit 38 is functionally arranged between the first pivot bearing unit 34 and the second pivot bearing unit 36. Via the linear bearing unit 38 a distance between the first pivot bearing unit 34 and the second pivot bearing unit 36 is variable. Herein the linear bearing unit 38 comprises a displacement axis 54, along which the linear bearing unit 38 permits a displacement. The linear bearing unit 38 is herein embodied as a friction bearing or a latch bearing.

The leg support module 24 comprises a first holding element 40. The first holding element 40 is configured for connecting the leg support module 24 to the transverse element 18. The holding element 40 is herein arranged centrally with respect to the seat bottom 12. As a result of this the leg support module 24 is arranged in a center of the seat bottom 12. Principally it is also conceivable that the holding element 40—and thus the leg support module 24—is oriented off-center with respect to the seat bottom 12. The holding element 40 is herein embodied as a clamp element. The holding element 40 comprises two holding regions 42, 44, in which the holding element 40 substantially wraps the transverse element 18 in an assembled state. The holding regions 42, 44 are embodied open at a first end and are respectively connectable via a fixation element 46 for fixation to the transverse element 18. The fixation elements 46 are herein embodied as screw elements. Principally it is also conceivable that the fixation elements 46 are implemented as different elements deemed expedient by someone skilled in the art, e.g. as rivets or clips or another type of non-positive fit and/or positive-fit elements. The holding element 40 is herein connected to the transverse element 18 in a rotation-fixed manner. For this purpose the leg support module 24 features a rotation-securisation (not shown in detail), via which the holding element 40 is arranged on the transverse element 18 in a torque-proof fashion. Due to the rotation-fixed connection, torques are introduisible into the transverse element 18 via the holding element 40. The holding element 40 implements a base body 48. The base body 48 is embodied in a one-part implementation with the holding regions 42, 44.

The leg support module 24 comprises a carrier element 58. The carrier element 58 is configured for coupling the leg support element 26 with the transverse element 18. The carrier element 58 is embodied as a flat plate. Principally it is also conceivable that the carrier element 58 is embodied as a profile element, which may principally also be implemented of a plurality of interconnected elements. Herein the carrier element 58, which is embodied as a flat plate, has a bend transversally to its main extension direction. The carrier element 58 has a substantially rectangular cross section in its main extension direction. Transversally to its main extension direction the carrier element 58 has an angled cross section. In an assembled state, a first end of the carrier element 58 faces toward the transverse element 18. A second end of the carrier element 58 faces in a mounted state toward the leg support element 26. The carrier element 58 forms a first flat partial portion 60 extending from a first end of the carrier element 58 to the bend in the carrier element 58. The carrier element 58 forms a second flat partial portion 62 extending from the bend in the carrier element 58 to the second end of the carrier element 58. The carrier element 58 comprises a through recess 64. The through recess 64 extends from an upper side to an underside of the carrier element 58. The through recess 64 extends from the first flat partial portion 60 over the bend into the second flat partial portion 62. The through recess 64 herein has a substantially rectangular shape. The through recess 64 has a width that is approximately equivalent to half a width of the carrier element 58. On the second end of the through recess 64, which faces towards the second end of the carrier element 58, the through recess 64 forms an accommodation 66. The accommodation 66 comprises a through hole that extends transversely to the main extension of the carrier element 58. The through hole of the accommodation 66 is configured to receive a fixation element, like in particular a fixation bolt.

The carrier element 58 is connected to the transverse element 18 via the first pivot bearing unit 34. The carrier element 58 is connected to the pivot bearing unit 34 with its first end. For connecting the carrier element 58, the first pivot bearing unit 34 forms a first bearing element 56. The first bearing element 56 is implemented by the base body 48 of the holding element 40. The first bearing element 56 is implemented by two bumps, which are embodied integrally with the base body 48 of the holding element 40 and each of which comprises a through hole, the through holes being oriented coaxially to one another. The through holes in the bumps of the first bearing element 56 each form a bearing point. The first pivot bearing unit 34 implements a second bearing element 68. The second bearing element 68 of the first pivot bearing unit 34 is implemented by the carrier element 58. The second bearing element 68 of the first pivot bearing unit 34 is herein arranged on the first end of the carrier element 58. The second bearing element 68, which is implemented by the carrier element 58, is embodied correspondingly to the first bearing element 56, which is implemented by the base body 48 of the holding element 40. The second bearing element 68 is implemented by two bumps, which are embodied integrally with the carrier element 58 and each of which comprises a through hole, the through holes being oriented coaxially to one another. The through holes in the bumps of the second bearing element 68 each form a bearing point 84. The first pivot bearing unit 34 comprises a bearing pin 70, via which the first bearing element 56 and the second bearing element 68 of the first pivot bearing unit 34 are pivotally coupled with each other. It is principally also conceivable that the first pivot bearing unit 34 comprises a plurality of bearing pins. The bearing pin 70 is herein guided through the through holes in the bumps of the two bearing elements 56, 68. The bearing pin 70 is axially fixated in the through holes of the bearing elements 56, 68 by securing elements which are not shown. The bearing pin 70 implements the pivot axis 50 of the first pivot bearing unit 34, about which the two bearing elements 56, 68 are pivotable with respect to one another.

The leg support module 24 comprises an actuator 20. Herein the leg support module 24 comprises only the one actuator 20. The actuator 20 is configured for an adjustment of the leg support element 26. The actuator 20 is configured for a rotation of the leg support element 26 about the pivot axis 50 of the first pivot bearing unit 34. The actuator 20 is embodied as a gas compression spring. Principally it is also conceivable that the actuator 20 is embodied as a hydraulic cylinder or as a different actuator that is deemed expedient by someone skilled in the art. The actuator 20 is arranged between the holding element 40 and the carrier element 58. The actuator 20 is fixedly connected, with its first end, to the holding element 40. For this purpose the base body 48 of the holding element 40 comprises the bearing point 84. Via the bearing point 84 the actuator 20 is connected to the holding element 40. Herein the actuator 20 is pivotally connected to the holding element 40 via the bearing point 84. With its second end the actuator 20 is fixedly connected to the carrier element 58. Herein the actuator 20 is connected to the carrier element 58 via the accommodation 66, which is arranged on the second end of the through recess 64 in the carrier element 58. The actuator 20 is herein arranged at least partially in the through recess 64. Herein the actuator 20 is arranged, pivotally via a bearing pin that is not shown, in the accommodation 66 of the carrier element 58. The actuator 20 is configured to provide in an actuated state a force pushing the holding element 40 and the carrier element 58 apart from each other. For the purpose of supplying the force, the actuator 20 comprises an energy storage as well as a piston rod that is arranged movably with respect to the energy storage. The piston rod is axially displaceable, with respect to the energy storage, along an actuation axis. In a non-actuated state, the actuator 20 is locked and does not supply a force. In an actuated state, the actuator 20 provides a force due to which a force is introduced into the carrier element 58 via the accommodation 66 and which is oriented away from the holding element 40 and thus from the transverse element 18. The force introduced into the accommodation 66 of the carrier element 58 is converted into a torque about the pivot axis 50 of the first pivot bearing unit 34 via a lever implemented by the distance between the accommodation 66 and the pivot axis 50 of the first pivot bearing unit 34. Due to the torque the carrier element 58 is rotated, in the actuated state of the actuator 20, about the pivot axis 50 of the first pivot bearing unit 34 insofar as no equivalent counterforce acts onto the carrier element 58, which acts counter to the force introduced by the actuator 20 and cancels the latter. In a non-actuated state, the actuator 20 is locked, thus holding the carrier element 58 in the respective position. For the purpose of actuating the actuator 20, the leg support module 24 comprises an actuating element (not shown). The actuating element is herein embodied as a push button. The actuating element embodied as a push button is herein connected to the actuator 20 via an actuating line (not shown). The actuating line mechanically forwards an actuating force exerted onto the actuating element to the actuator 20. The actuating line is herein embodied as a Bowden cable. When the actuating element is actuated, the actuator 20 is in its actuated state. When the actuating element is not actuated, the actuator 20 is in its non-actuated state. Principally it is also conceivable that the actuating element—and thus the actuating line as well—is/are implemented in a different manner, e.g. as an electric feeler or a respective electric line.

The linear bearing unit 38 is arranged on the carrier element 58. The linear bearing unit 38 comprises a first linear bearing element 72. The first linear bearing element 72 is embodied as a slide rail element. The first linear bearing element 72 of the linear bearing unit 38 is rigidly connected to the carrier element 58. Herein the first linear bearing element 72 is fixedly mounted on the second flat partial portion 62 of the carrier element 58. The first linear bearing element 72 is herein arranged on a side of the second flat partial portion 62 of the carrier element 58 which faces away from the seat bottom 12 in the stowage position. The first linear bearing element 72 is herein fixedly screwed on the second flat partial portion 62 of the carrier element 58 via a screw connection that is not shown. Of course there are principally other expedient positive-fit and non-positive fit connections conceivable, for example rivets. Principally a substance-to-substance bond is also conceivable. The linear bearing unit 38 comprises a second linear bearing element 74. The second linear bearing element 74 is embodied as a slide rail element. The second linear bearing element 74 is embodied correspondingly to the first linear bearing element 72 of the linear bearing unit 38. The two linear bearing elements 72, 74 engage into one another in a positive-fit fashion and are displaceable with respect to one another along the displacement axis 54 of the linear bearing unit 38. The second linear bearing element 74 is herein mounted on a side of the first linear bearing element 72 that faces away from the carrier element 58. The second linear bearing element 74 runs in the first linear bearing element 72. The second linear bearing element 74 has one degree of freedom relative to the first linear bearing element 72. The linear bearing unit 38 has a traversing distance of 100 mm. The second linear bearing element 74 is displaceable, with respect to the first linear bearing element 72, by 100 mm along the displacement axis 54. Principally it is also conceivable that the linear bearing unit 38 is implemented as a different linear bearing that is deemed expedient by someone skilled in the art and comprises, for example, a roll running on a run-off surface that is implemented correspondingly. Principally it is also conceivable that a linear bearing element of a linear bearing unit is embodied as a cylinder which is displaceably borne in at least one accommodation, e.g. an eyelet that is shaped accordingly.

The leg support module 24 comprises a fixation plate 76. The fixation plate 76 is configured for the leg support element 26 to be mounted thereon. The fixation plate 76 is embodied as a flat plate. The fixation plate 76 is coupled to the carrier element 58 via the linear bearing unit 38. For a coupling with the carrier element 58, the fixation plate 76 is rigidly connected to the second linear bearing element 74 of the linear bearing unit 38. The fixation plate 76 is mounted on a side of the second linear bearing element 74 that faces away from the first linear bearing element 72. The second pivot bearing unit 36 is mounted on the fixation plate 76. Via the second pivot bearing unit 36 the leg support element 26 is pivotally mounted on the fixation plate 76. The second pivot bearing unit 36 comprises a first bearing element 78. The first bearing element 78 of the second pivot bearing unit 36 is implemented as a bump with an accommodation. The first bearing element 78 is fixedly connected to the fixation plate 76. It is herein also conceivable that the first bearing element 78 is implemented integrally with the fixation plate 76. The second pivot bearing unit 36 comprises a second bearing element 80. The second bearing element 80 of the second pivot bearing unit 36 is rigidly connected to the base body 30 of the leg support element 26. The second bearing element 80 of the second pivot bearing unit 36 is arranged on an underside of the leg support element 26. The second bearing element 80 is embodied correspondingly to the first bearing element 78 of the second pivot bearing unit 36. The second bearing element 80 is embodied as a bump with an accommodation. The second pivot bearing unit 36 comprises a bearing pin 82, via which the two bearing elements 78, 80 of the second pivot bearing unit 36 are pivotable to each other. The bearing pin 82 is herein guided through the accommodations of the two bearing elements 78, 80 and is axially secured in said accommodations by respective securing elements, which are not shown here.

The leg support element 26 is connected to the fixation plate 76 via the second pivot bearing unit 36, the fixation plate 76 is connected to the carrier element 58 via the linear bearing unit 38, and the carrier element 58 is connected to the transverse element 18—and thus to the base structure 22 of the flight passenger seat 10—via the first pivot bearing unit 34. The leg support element 26 is connected to the flight passenger seat 10 via the second pivot bearing unit 36, the fixation plate 76, the linear bearing unit 38, the carrier element 58 and the first pivot bearing unit 34. In the first maximum position of the leg support module, which is implemented as a stowage position and is depicted in FIG. 1, the leg support element 26 is arranged below the seat bottom 12 of the flight passenger seat 10. Herein, in a stowage position the leg support element 26 constitutes a frontward ending of the flight passenger seat 10 below the seat bottom 12. The carrier element 58 is in the stowage position of the leg support module 24 folded into a folded-up position, in which the carrier element 58 is oriented substantially orthogonally to the seat bottom 12, respectively to a cabin floor. In the stowage position of the leg support module 24 the actuator 20 is in a minimum position. In the stowage position of the leg support module 24 the linear bearing unit 38 is in a minimum position. In the minimum position the fixation plate 76, which is displaceable via the linear bearing unit 38—and thus the transverse element 18, which is fixated to the fixation plate 76—is/are maximally traversed toward the holding element 40 and thus toward the transverse element 18 of the flight passenger seat 10. For an adjustment of the leg support module 24 out of the stowage position, the actuator 20 is brought into an actuated state via the operating element, resulting in the actuator 20 exerting a force onto the carrier element 58. The force generates a torque about the pivot axis 50 of the first pivot bearing unit 34, as a result of which the carrier element 58—and thus the leg support element 26 as well—is/are pivoted out of the stowage position frontward and upward if there is no greater counterforce acting on the carrier element 58. In the adjustment the actuator 20 is deployed with its piston rod. For the duration of the actuator 20 being held in an actuated state via the actuating element and exerting a force onto the carrier element 58, the carrier element 58—and thus the leg support element 26—is/are traversed towards the maximally deployed usage position. The carrier element 58 is adjustable out of its stowage position by approximately 90 degrees until the leg support element 26 is oriented with its support surface 28 substantially in parallel to the seat surface 14 of the seat bottom 12. In the maximum adjustment position of the carrier element 58, the actuator 20 is in a maximally deployed position, thus implementing a stop for an adjustment of the carrier element 58. Principally it is also conceivable that the leg support module 24 comprises a mechanical stop, which the carrier element 58 abuts on in a maximum adjustment position of the carrier element 58. When the carrier element 58 has been pivoted out of its stowage position, a distance of the leg support element 26 to the seat bottom 12 is adjustable via the linear bearing unit 38. An orientation of the leg support element 26 with respect to the seat bottom 12 and a tilting of the leg support element 26 to the seat bottom 12 may be effected via the second pivot bearing unit 36. This allows optimum adjustment of the leg support element 26 for different passengers according to their wishes, thus increasing comfort. Depending on a passenger's leg length and desired positions of the leg support element 26, the linear bearing unit 38 and the second pivot bearing unit 36 are adjustable accordingly.

The leg support module 24 comprises a reset mechanism 86. The reset mechanism 86 is configured for an automatic reset movement of the leg support element 26 out of a deployed position. When the leg support element 26 has been deployed out of the stowage position and the linear bearing unit 38 has been deployed out of its minimum position, which means the leg support element 26 has been adjusted from the smallest possible distance to the transverse element 18 into a greater distance to the transverse element 18, then the reset mechanism 86 is configured to set the linear bearing unit 38 back into its minimum position on reset of the carrier element 58 into the stowage position.

The reset mechanism 86 comprises a first lever element 88. The first lever element 88 is pivotally mounted on the holding element 40. For this purpose the holding element 40 comprises an accommodation 90 which pivotally connects the lever element 88 to the holding element 40. The accommodation 90 implements a bearing axis, which the lever element 88 is pivotable about. The bearing axis of the accommodation 90 is offset to the pivot axis 50 of the first pivot bearing unit 34. A bearing via which the lever element 88 is borne with respect to the holding element 40 is embodied as a wobble bearing. In a rotation about the bearing axis of the bearing, the lever element 88 is hence tilted toward the bearing axis. The accommodation 90 is embodied in a one-part implementation with the base body 48 of the holding element 40. The lever element 88 is embodied as a rodshaped element. The lever element 88 herein extends, starting from the holding element 40, substantially in the same direction as the carrier element 58. The lever element 88 is connected, with its first end, to the accommodation 90 of the holding element 40. Herein the accommodation 90—and thus the lever element 88—is/are in an assembled state arranged on a first side of the carrier element 58.

The reset mechanism 86 comprises a deflecting element 92. The deflecting element 92 is embodied as a flat rod. With its first end the deflecting element 92 is pivotally coupled to the second end of the lever element 88. Herein the deflecting element 92 and the lever element 88 are pivotally connected to each other via a coupling point 94. The coupling point 94 herein implements a compensation bearing, which permits a compensation of the angle differences between the lever element 88 and the deflecting element 92. The deflecting element 92 implements a deflection point 96. The deflecting element 92 comprises an accommodation in the deflection point 96. In correspondence to the accommodation of the deflecting element 92, the carrier element 58 implements a corresponding accommodation. In the deflection point 96, the deflecting element 92 is rotatable with respect to the carrier element 58 via a bearing pin (not shown). The deflection point 96 is herein arranged between the first end of the deflecting element 92, in which the deflecting element 92 is connected to the lever element 88, and a second end of the deflecting element 92. A distance between the first end of the deflecting element 92 and the deflection point 96 is herein smaller than a distance between the second end of the deflecting element 92 and the deflection point 96. The deflecting element 92 spans over the carrier element 58. The first end of the deflecting element 92 is arranged on the first side of the carrier element 58. The second end of the deflecting element 92 is arranged on a second side of the carrier element 58.

The reset mechanism 86 comprises a guiding plate 98. The guiding plate 98 is embodied as an elongate flat plate. With its first end, the guiding plate 98 is pivotally coupled to the second end of the deflecting element 92 via a coupling point 100. For this purpose the second end of the deflecting element 92 and the first end of the guiding plate 98 each comprise an accommodation, said accommodations forming the coupling point 100 together with a bearing element that is not shown. The coupling point 100 herein implements a compensation bearing, which permits a compensation of angle differences between the deflecting element 92 and the guiding plate 98. The guiding plate 98 comprises a guiding element 102. The guiding element 102 is embodied as a groove. Herein the guiding element 102 is embodied as a through groove extending from an upper side of the guiding plate 98 to an underside of the guiding plate 98. The guiding element 102 implements a curved track. Herein a center of the curved track implemented by the guiding element 102 is situated on the side that faces away from the carrier element 58. The guiding element 102 is configured to couple the guiding plate 98 with the fixation plate 76 of the leg support module 24. For a coupling with the guiding element 102 the fixation plate 76 comprises a connection zone 104. The connection zone 104 extends from the second pivot bearing unit 36 into a region that protrudes over the second side of the carrier element 58. In a peripheral end region the connection zone 104 comprises an accommodation hole 106. The accommodation hole 106 is configured to couple the connection zone 104—and thus the fixation plate 76—with the guiding plate 98. The reset mechanism 86 comprises a connection element 108 which, in an assembled state, connects the fixation plate 76 and the guiding plate 98 via the accommodation hole 106 and the guiding element 102. The connection element 108 is embodied as a pin. The connection element 108, which is embodied as a pin, engages through the accommodation hole 106 of the connection zone 104 of the fixation plate 76 as well as through the guiding element 102 of the guiding plate 98. The connection element 108 is axially fixed in the accommodation hole 106 and in the guiding element 102. The connection element 108 is herein captively held in the accommodation hole 106 and in the guiding element 102 by securing elements which are not shown. The connection element 108 is arranged in such a way that it is displaceable in the guiding element 102 which is embodied as a groove. The connection element 108 has in the guiding element 102 a first end position, in which the connection element 108 abuts on a first end of the guiding element 102, which faces towards the first end of the guiding plate 98. The connection element 108 has in the guiding element 102 a second end position, in which the connection element 108 abuts on a second end of the guiding element 102, which faces towards the second end of the guiding plate 98.

In the following the functionality of the leg support module 24 and in particular the resetting of the leg support element 26 out of a deployed usage position by means of the reset mechanism 86 will be explained. FIGS. 1, 4 and 6 show different views of the maximum position of the leg support module 24, which is implemented as the stowage position and in which the leg support element 26 is arranged below the seat bottom 12 and is oriented approximately in a 90-degree angle to the cabin floor and to the seat surface 14. The lever element 88 of the reset mechanism 86 extends in this position until underneath the deflection point 96, by which the deflecting element 92 is pivotally borne on the carrier element 58. Due to the coupling of the lever element 88 with the deflecting element 92 via the coupling point 94, the deflecting element 92 is with its first end, viewed from the pivot axis 50 of the first pivot bearing unit 34 via which the carrier element 58 is connected to the transverse element 18, farther away than the deflection point 96, as a result of which the deflecting element 92 is oriented with its second end toward the pivot axis 50 of the first pivot bearing unit 34. In this position the second end of the deflecting element 92 is arranged nearer to the pivot axis 50 of the first pivot bearing unit 34 than the first end of the deflecting element 92. The guiding plate 98, which is coupled with the second side of the deflecting element 92 via the coupling point 100, is in this position displaced as far as possible toward the pivot axis 50, and the connection element 108 has, in the guiding element 102, its second end position, in which the connection element 108 abuts on a second end of the guiding element 102 which faces towards the second end of the guiding plate 98. Due to the connection element 108 abutting on the second end of the guiding element 102 which faces towards the second end of the guiding plate 98, the linear bearing unit 38 is blocked, as a result of which the two linear bearing elements 72*m* 74 are not displaceable with respect to one another. In this way, in this position an axial displacement of the leg support element 26 along the displacement axis 54 of the linear bearing unit 38 is prevented.

When the carrier element 58 is pivoted out of the stowage position, the coupling point 94, via which the lever element 88 is coupled with the deflecting element 92, is displaced, with respect to the deflection point 96, due to the pivot axis 50 of the first pivot bearing unit 34 and the bearing axis of the accommodation 90, by which the lever element 88 is borne, being arranged offset from each other. Herein the coupling point 94 is displaced, with respect to the deflection point 96, towards the pivot axis 50. By way of this displacement, in which the coupling point 94, and thus the first end of the deflecting element 92 as well, moves/move towards the pivot axis 50, the deflecting element 92 is rotated about the deflection point 96, as a result of which the second end of the deflecting element 92 is moved away from the pivot axis 50. Herein the deflecting element 92 is rotated about the deflection point 96 proportionately to the pivoting of the carrier element 58 about the pivot axis 50 of the first pivot bearing unit 34. Due to the coupling of the deflecting element 92 with the guiding plate 98 via the coupling point 100, which is arranged on the second end of the deflecting element 92, the guiding plate 98 is, in this rotation of the deflecting element 92, moved away from the pivot axis 50. In FIGS. 2, 3, 5 and 7 a respective position is shown in which the carrier element 58 has been pivoted out of the rest position and the guiding plate 98 has been displaced, due to adjustment of the reset mechanism 86, with respect to the carrier element 58, away from the pivot axis 50. Due to the displacement of the guiding plate 98 with respect to the carrier element 58, the connection element 108 is displaced, in the guiding element 102, out of the second end position. Due to the displacement of the connection element 108, in the guiding element 102 of the guiding plate 98, out of the second end position, the linear bearing unit 38 is unblocked, allowing the leg support element 26 to be displaced along the displacement axis 54 via the linear bearing unit 38. Herein a potential unblocked traversing distance of the leg support element 26 via the linear bearing unit 38 is the greater, the farther the connection element 108 is moved out of the second end position. The farther the carrier element 58 is pivoted out of the stowage position, the farther the guiding plate 98, and thus the connection element 108 in the guiding element 102, is displaced to the carrier element 58, and thus the farther the connection element 108 is displaced in the guiding element 102. This allows the leg support element 26 being displaced the farther along the displacement axis 54 via the linear bearing unit 38, the farther the carrier element 58 is pivoted out of the stowage position. If the carrier element 58 has been pivoted into the second maximum position of the leg support module 24 (cf. FIG. 2) and the leg support element 26 has not been moved out of its minimum position via the linear bearing unit 38, the connection element 108 is in its first end position and abuts on the first end of the guiding element 102, which faces towards the first end of the guiding plate 98. As a result, in the second maximum position of the leg support module 24 the whole traversing distance provided by the linear bearing unit 38 along the displacement axis 54 is unblocked. If the carrier element 58 has been pivoted out of the stowage position, the passenger may displace the leg support element 26 by means of the linear bearing unit 38 along the displacement axis 54 depending on how far the carrier element 58 has been pivoted, thus unblocking a traversing distance by the reset mechanism 86, and the passenger may adjust the leg support element 26 as regards its inclination to the seat bottom 12 via the second pivot bearing unit 36. This allows the passenger adjusting the leg support element 26 of the leg support module 24 into an optimum position easily.

From a position in which the carrier element 58 is pivoted out of its stowage position and the leg support element 26 is displaced along the displacement axis 54 via the linear bearing unit 38, the connection element 108 is arranged, in accordance with the adjustment of the linear bearing unit 38, between the two end positions in the guiding element 102 (e.g. FIG. 3). If the carrier element 58 is then pivoted out of this position back towards the stowage position, the lever element 88 and the carrier element 58 are displaced with respect to one another, contrarily to the displacement effected with pivoting out of the stowage position. Due to this displacement of the lever element 88 and the carrier element 58 with respect to one another, the deflecting element 92 is moved back towards its position in the stowage position and its second end, on which the deflecting element 92 is coupled with the guiding plate 98, is displaced back towards the pivot axis 50. As a result of this movement, the connection element 108 abuts on a certain point at the second end of the guiding element 102 and is taken along towards the pivot axis 50 by the further movement of the guiding plate 98. In this way the linear bearing unit 38—and thus the leg support element 26—is displaced back into the minimum position in case of a pivoting of the carrier element 58 back into the stowage position that is effected via the reset mechanism 86 and in particular via the coupling of the fixation plate 76 and the guiding plate 98 by means of the connection element 108. As a result, it is possible, in case of a pivoting back into the stowage position, to prevent the leg support element 26 or the fixation plate 76 from remaining in a deployed state and thus hitting onto the cabin floor.

The leg support module 24 comprises a cover unit 110. The cover unit 110 is configured for spanning over a region between the seat bottom 12 and the leg support element 26. The cover unit 110 comprises a fabric or leather element 112. The fabric or leather element 112 is arranged between the leg support element 26 and the seat bottom 12. Herein the fabric or leather element 112 is fixedly connected to a front end of the seat bottom 12 with a first end, and is fixedly connected to a side of the leg support element 26 that faces towards the seat bottom 12 with a second end. The fabric or leather element 112 is herein embodied elastically, allowing it to reliably cover the region between the leg support element 26 and the seat bottom 12 in the different distances in which the leg support element 26 may be arranged with respect to the seat bottom 12. Principally it is also conceivable that the cover unit 110 comprises a different cover element which is, for example, capable of compensating the different distances between the leg support element 26 and the seat bottom 12 by means of an appropriate folding. Herein, for the sake of overview, the cover unit 110 with the fabric or leather element 112 is schematically depicted only in FIG. 1.

The cover unit 110 further comprises a cover plate 114. The cover plate 114 is schematically depicted in FIG. 3. The cover plate 114 is configured for covering movable parts of the leg support module 24, like in particular the linear bearing unit 38 and the reset mechanism 86, to avoid a passenger getting, for example, his fingers caught in the movable parts. Herein the cover plate 114 is preferably implemented as a profiled plate in such a way that the cover plate 114 encloses the movable parts of the leg support module 24 from as many sides as possible. The cover plate 114 is herein fixated to the carrier element 58. Principally it is also conceivable that the cover plate 114 is connected, for example, to the holding element 40. Principally it is further conceivable that the cover plate 114 is embodied as a bearing element implementing a fixation point for an element or a plurality of elements of the reset mechanism 86 and/or of the leg support module 24.

In FIGS. 8 and 9 a further exemplary embodiment of the invention is shown. The following description and the drawings are substantially restricted to the differences between the exemplary embodiments, wherein regarding structural components with the same denomination, in particular regarding structural components with the same reference numerals, principally the drawings and/or description of the other exemplary embodiment of FIGS. 1 to 7 may be referred to. For better distinguishing the exemplary embodiments, the letter b has been added to the reference numerals of the second exemplary embodiment in FIGS. 7 and 8.

FIGS. 7 and 8 show a second exemplary embodiment of a flight passenger seat device according to the invention. The flight passenger seat device comprises a flight passenger seat 10*b*. The flight passenger seat 10*b* comprises a seat bottom (not shown) providing a seat surface for a passenger. The flight passenger seat 10*b* is mounted in an aircraft cabin. For this purpose the flight passenger seat 10*b* comprises a mounting unit 16*b*. By means of the mounting unit 16*b* the flight passenger seat 10*b* is fixedly arranged on a cabin floor of the aircraft cabin. The flight passenger seat 10*b* comprises a first frontal transverse element 18*b* and a second rear transverse element. Principally it is also conceivable that the transverse element 18*b* is implemented as a single transverse element of the flight passenger seat 10*b*. The flight passenger seat 10*b* is herein embodied as part of a seat row which is not shown in detail.

The flight passenger seat 10*b* comprises a leg support module 24*b*. The leg support module 24*b* is configured for a passenger sitting on the flight passenger seat 10*b* to lay his legs and/or his feet on it. The leg support module 24*b* is directly connected to a base structure 22*b* of the flight passenger seat 10*b*. The leg support module 24*b* is herein attached to the frontal transverse element 18*b* of the base structure 22*b*. The leg support module 24*b* comprises a leg support element 26*b*. Principally it is also conceivable that the leg support module 24*b* comprises a plurality of leg support elements 26*b*. The leg support element 26*b* implements a support surface 28*b*, which is configured for a passenger sitting on the flight passenger seat 10*b* to lay his leg and/or his foot on it. The leg support element 26*b* comprises a base body 30*b*. The base body 30*b* is embodied as a planar element. The base body 30*b* is, for example, made of a metal sheet or of a fiber composite material.

The leg support element 26*b* is embodied to be partially movable with respect to the seat bottom of the flight passenger seat 10*b*. The leg support element 26*b* is pivotable and displaceable to the seat bottom in a variety of positions. The leg support element 26*b* herein features a first maximum position and a second maximum position. The leg support element 26*b* is continuously adjustable between its two maximum positions. The first maximum position is implemented as a stowage position. A second maximum position is implemented as a maximally deployed usage position.

For the purpose of adjusting the leg support element 26*b*, the leg support module 24*b* comprises two pivot bearing units 34*b*, 36*b* and a linear bearing unit 38*b*. The first pivot bearing unit 34*b* is configured for pivoting the leg support element 26*b* with respect to the transverse element 18*b*. The second pivot bearing unit 36*b* is arranged spaced apart from the first pivot bearing unit 34*b*. The second pivot bearing unit 36*b* is configured for adjusting an orientation of the leg support element 26*b* with respect to the seat bottom. The linear bearing unit 38*b* is configured for adjusting a distance of the leg support element 26*b* to the seat bottom. For this purpose the linear bearing unit 38*b* is functionally arranged between the first pivot bearing unit 34*b* and the second pivot bearing unit 36*b*. A distance between the first pivot bearing unit 34*b* and the second pivot bearing unit 36*b* is variable via the linear bearing unit 38*b*.

The leg support module 24*b* comprises a carrier element 58*b*. The carrier element 58*b* is configured for coupling the leg support element 26*b* with the transverse element 18*b*. In a mounted state, a first end of the carrier element 58*b* faces towards the transverse element 18*b*. A second end of the carrier element 58 faces, in the mounted state, the leg support element 26*b*. The carrier element 58*b* is connected to the transverse element 18*b* via the first pivot bearing unit 34*b*. The carrier element 58*b* is connected to the pivot bearing unit 34*b* with its first end.

The linear bearing unit 38*b* comprises two first linear bearing elements 116*b*, 118*b*. The two first linear bearing elements 116*b*, 118*b* are fixedly mounted on the carrier element 58*b*. The two linear bearing elements 116*b*, 118*b* are arranged spaced apart from one another. The linear bearing elements 116*b*, 118*b* are arranged in parallel to one another. The linear bearing elements 116*b*, 118*b* each implement a bearing axis. The bearing axes of the linear bearing elements 116*b*, 118*b* are parallel to one another. The linear bearing elements 116*b*, 118*b* are arranged in parallel to the displacement axis of the linear bearing unit 38*b*. The linear bearing unit 38*b* comprises two second linear bearing elements 120*b*, 122*b*. The second linear bearing elements 120*b*, 122*b* are embodied correspondingly to the first linear bearing elements 116*b*, 118*b*. Herein the one second linear bearing element 120*b* is embodied correspondingly to the one first linear bearing element 116*b*. The one second linear bearing element 120*b* and the one first linear bearing element 116*b* engage into one another in a positive-fit fashion and are displaceable with respect to each other along the displacement axis of the linear bearing unit 38*b*. The one second linear bearing element 122*b* is embodied correspondingly to the one first linear bearing element 118*b*. The one second linear bearing element 122*b* and the one first linear bearing element 118*b* engage into each other in a positive-fit fashion and are displaceable with respect to one another along the displacement axis of the linear bearing unit 38*b*. The linear bearing elements 116*b*, 118*b*, 120*b*, 122*b* are each embodied as slide-bearing elements. The first linear bearing elements 116*b*, 118*b* and the second linear bearing elements 120*b*, 122*b*, which respectively engage into each other, respectively implement a guidance. The two guidances 124*b*, 126*b* of the linear bearing unit 38*b* are arranged in parallel to one another. Due to the two parallel guidances 124*b*, 126*b* implementing the linear bearing unit 38*b*, a particularly stable and secure bearing of the leg support element 26*b* is achievable. In particular a canting of the respective linear bearing elements 116*b*, 118*b*, 120*b*, 122*b* into each other, caused by eccentrically attacking forces, is advantageously preventable. The leg support module 24*b* comprises a fixation plate 76*b*. The fixation plate 76*b* is configured for the leg support element 26*b* to be mounted thereon. The fixation plate 76*b* is coupled with the carrier element 58*b* via the linear bearing unit 38*b*. For coupling with the carrier element 58*b* the fixation plate 76*b* is rigidly connected to the second linear bearing elements 120*b*, 122*b* of the linear bearing unit 38*b*. The fixation plate 76*b* is mounted on a side of the second linear bearing elements 120*b*, 122*b* that faces away from the first linear bearing elements 116*b*, 118*b*. The second pivot bearing unit 36*b* is mounted on the fixation plate 76*b*. Via the second pivot bearing unit 36*b*, the leg support element 26*b* is pivotally mounted on the fixation plate 76*b*.

The linear bearing unit 38*b* is herein connected to the leg support element 26*b* in off-center fashion. Via the leg support element 26*b*, the fixation plate 76*b* is mounted, viewed in a transverse direction, nearer to a first end of the leg support element 26*b* than to a second end that is situated opposite. As a result, there is a space in a region of the second end of the leg support element 26 which is not involved in supporting the leg support module 24*b* and is larger than a space in a region of the first end of the leg support element 26*b*. The leg support module 24*b* comprises a first holding element 40*b*. The first holding element 40*b* is configured for connecting the leg support module 24 to the transverse element 18*b*. The holding element 40*b* is herein arranged off-center with respect to the seat bottom. Herein the holding element 40*b* is arranged in such a way that the off-center connection of the fixation plate 76*b* to the leg support element 26*b* is compensated, as a result of which the leg support module 24*b* is arranged in a center of the seat bottom. The holding element 40*b* wraps around the transverse element 18*b*. The holding element 40*b* is herein mounted to the transverse element 18*b* via fixation elements. Principally it is also conceivable that the holding element 40*b* is, additionally or exclusively, connected to the transverse element by a different connection method, e.g. gluing or riveting.

The leg support module 24*b* comprises a life-vest container 128*b*. The life-vest container 128*b* is configured for allowing a life-vest to be securely stowed at the flight passenger seat in such a way that it is easily retrievable by a passenger in case of emergency. For this purpose the life-vest container 128*b* is integrated in the leg support element 26*b*. The life-vest container 128*b* is herein arranged in a region of the second end of the leg support element 26*b*. Due to the off-center connection of the bearing of the leg support module 24, this region is implemented advantageously large. The life-vest container 128*b* comprises a shell element 130*b*. The shell element 130*b* is made of a thin-walled material. The shell element 130*b* is made of a metal sheet. Principally it is also conceivable that the shell element 130*b* is made of a different material, e.g. a fiber-composite material or a synthetic material. The shell element 130*b* comprises a substantially closed bottom and side walls delimiting the bottom all around. On a side that faces away from the bottom the side walls respectively feature a flange, via which flanges the shell element 130*b* is couplable to the base body 30*b* of the leg support element 26*b*. The base body 30*b* comprises an opening 132*b*, behind which the shell element 130*b* is arranged. Roundabout the opening 132*b* the shell element 130*b* is connected to the base body 30*b*. Herein the shell element 130*b* is connected to the base body 30*b* via suitable connection elements, e.g. rivets. Principally it is also conceivable that the shell element 130*b* is embodied glued with the base body 30*b* or in a one-part implementation with the base body 30*b*.

The life-vest container 130*b* comprises a closure flap 134*b*. Via the closure flap 134*b*, the region in which the life-vest is arranged inside the life-vest container 130*b* may be closed off from the outside. The closure flap 134*b* is embodied as a pivotable flap. Principally it is also conceivable that the closure flap 134*b* is supported in a different manner, e.g. in a linearly displaceable manner or that it is mounted to the base body 30*b* just in an entirely removable manner. The closure flap 134*b* is connected to the base body 30*b* in such a way that it is pivotable via a hinge 144*b*. The hinge 144*b*, via which the closure flap 134*b* is borne on the base body 30*b*, is herein arranged at an end of the base body 30*b* that faces away from the seat bottom. The closure flap 134*b* of the life-vest container 130*b* comprises a handle element 140*b*, by which the closure flap 134*b* may be opened. The handle element 140*b* is embodied as a lug which is fixedly connected to the closure flap 134*b*. Via the handle element 140*b* the life-vest container 130*b* may be opened and the life-vest may be retrieved. Principally it is also conceivable that the handle element 140*b* is connected to the life-vest directly, thus allowing the life-vest to be grasped directly via the handle element 140*b*. The life-vest container 130*b* further comprises a securing element. The securing element is embodied as a seal which is destroyed when the closure flap 134*b* of the life-vest container 130*b* is opened.

The leg support element 26*b* comprises a cushioning element 32*b*. The cushioning element 32*b* is connected to the base body. The cushioning element 32*b* implements the support surface 28*b* of the leg support element 26*b*. The cushioning element 32*b* is herein embodied in a two-part implementation. The cushioning element 32*b* is embodied of two paddings 136*b*, 138*b*. The first padding 136*b* is fixedly connected to the base body of the leg support element 26*b* and covers the region of the leg support element 26*b* in which the life-vest container 130*b* is not arranged. The second padding 138*b* is arranged in the region of the life-vest container 130*b*. Herein the paddings 136*b*, 138*b* are connected to each other. The paddings 136*b*, 138*b* are herein dimensioned identically in their transverse extension. Viewed in a transverse direction, the paddings are thus centrally connected to each other. The paddings 136*b*, 138*b* are herein movable with respect to each other via a connection point. Principally it is also conceivable that the two paddings 136*b*, 138*b* forming the cushioning element 32*b* are embodied separately. Herein it would be conceivable that the one padding is only connected to the base body 30*b* and the other padding 138*b* is only connected to the closure flap 134*b*. The paddings 136*b*, 138*b* are herein connected to the base body 30*b* and the closure flap 134*b* via hook-and-loop fastener bands.

A further embodiment of the leg support module 24*b* is equivalent to the first exemplary embodiment. In particular a function and an overall functionality of a reset mechanism 86 correspond to the description of the first exemplary embodiment. As in the first exemplary embodiment, the leg support module 24*b* comprises a reset mechanism 86, which is not shown here in detail. The reset mechanism 86*b* is configured for an automatic reset movement of the leg support element 26*b* out of a deployed position, and is substantially identical to the reset mechanism 86*a* of the first exemplary embodiment in regard to its function. The reset mechanism 86*b* herein also comprises a guiding element 102*b*. Differently from the first exemplary embodiment, the guiding element 102*b* is implemented not in a separate guiding plate but directly in a fixation plate 76*b* of the leg support module 24*b*. Differently from the first exemplary embodiment, the guiding element 102*b* is embodied straight. The guiding element 102*b* is embodied as a straight groove. Differently from the first exemplary embodiment, the guiding element 102*b* does not feature a curvature.

REFERENCE NUMERALS

10 flight passenger seat
12 seat bottom
14 seat surface
16 mounting unit
18 transverse element
20 actuator
22 base structure
24 leg support module
26 leg support element
28 support surface
30 base body
32 cushioning element
34 pivot bearing unit
36 pivot bearing unit
38 linear bearing unit
40 holding element
42 holding region
44 holding region
46 fixation element
48 base body
50 pivot axis
52 pivot axis
54 displacement axis
56 first bearing element
58 carrier element
60 first flat partial portion
62 second flat partial portion
64 through recess
66 accommodation
68 second bearing element
70 bearing pin
72 linear bearing element
74 linear bearing element
76 fixation plate
78 bearing element
80 bearing element
82 bearing pin
84 bearing point
86 reset mechanism
88 lever element
90 accommodation
92 deflecting element
94 coupling point
96 deflection point
98 guiding plate
100 coupling point
102 guiding element
104 connection zone
106 accommodation hole
108 connection element
110 cover unit
112 fabric or leather element
114 cover plate
116 linear bearing element
118 linear bearing element
120 linear bearing element
122 linear bearing element
124 guidance
126 guidance
128 life-vest container
130 shell element
132 opening
134 closure flap
136 padding
138 padding
140 handle element
144 hinge

The invention claimed is:

1. A flight passenger seating device, comprising:
a flight passenger seat which has a seat bottom, a transverse element and a leg support module, which has a leg support element, wherein
the leg support element comprises a cushioning element, which implements a support surface, so that the support surface is configured to allow a passenger sitting on the flight passenger seat in at least one position of the leg support element to rest his or her leg and/or foot on the support surface, and in at least one position of the leg support element, the leg support element is at least partly movable with respect to the seat bottom, the leg support module comprises at least two pivot bearings and a linear bearing, by means of which the leg support element is supported movably with respect to the seat bottom,
a first pivot bearing of the at least two pivot bearings, which comprises a pivot axis about which the leg support element is pivotal and which is oriented parallel to a middle axis of the transverse element, is configured for pivoting the leg support element with respect to the transverse element,
a second pivot bearing of the at least two pivot bearings, which is embodied as a friction bearing or a latch bearing, allowing a variety of positions to be securely held by the second pivot bearing, is configured for adjusting an orientation of the support surface of the leg support element to the seat bottom,
via the linear bearing, which comprises a translational axis with respect to which the at least two elements pivot bearings, which are displaceably coupled, are displaceable with respect to one another, a distance between the first pivot bearing and the second pivot bearing is variable, and
the support surface is entirely movable along the translational axis of the linear bearing.

2. The flight passenger seating device according to claim 1, wherein the leg support module is mounted to the flight passenger seat directly.

3. The flight passenger seating device according to claim 1, wherein the flight passenger seat comprises at least one base structure which the leg support module is mounted on.

4. The flight passenger seating device according to claim 1, wherein the leg support module comprises a cover unit, which in at least one operating state covers a region between the seat bottom and the leg support element.

5. The flight passenger seating device according to claim 4, wherein the cover unit comprises at least one fabric or leather element, which in the at least one operating state covers the region between the seat bottom and the leg support element.

6. The flight passenger seating device according to claim 1, wherein the leg support module comprises a reset mechanism, which is configured for an automatic reset movement of the leg support element out of a deployed position.

7. The flight passenger seating device according to claim 6, wherein the reset mechanism is configured to reset an adjustment of the linear bearing.

8. The flight passenger seating device according to claim 1, wherein the leg support module comprises only one actuator, which is configured for adjusting the leg support element.

9. The flight passenger seating device according to claim 1, wherein the leg support module is connected centrally underneath the seat bottom.

10. The flight passenger seating device according to claim 1, wherein the reset mechanism is in at least one position configured for blocking the linear bearing.

11. The flight passenger seating device according to claim 1, wherein the leg support module comprises at least one life-vest container, which is at least partly integrated in the leg support module.

12. The flight passenger seating device according to claim 1, wherein the leg support element is connected to the transverse element off-center with respect to the seat bottom.

13. The flight passenger seating device according to claim 1, wherein the linear bearing comprises at least two parallel-running guidances.

14. A flight passenger seating device, comprising:
a flight passenger seat which has a seat bottom, a transverse element, and a leg support module, which has a leg support element, wherein
the leg support element comprises a cushioning element, which implements a support surface and, in at least one position of the leg support element, the leg support element is at least partly movable with respect to the seat bottom,
the leg support module comprises at least two pivot bearings and a linear bearing, by means of which the leg support element is supported movably with respect to the seat bottom,
a first pivot bearing of the at least two pivot bearings, which comprises a pivot axis, about which the leg support element is pivotal and which is oriented parallel to a middle axis of the transverse element, is configured for pivoting the leg support element with respect to the transverse element,
a second pivot bearing of the at least two pivot bearings, which is embodied as a friction bearing or a latch bearing, allowing a variety of positions to be securely held by the second pivot bearing, is configured for adjusting an orientation of the support surface of the leg support element to the seat bottom,
via the linear bearing, which comprises a translational axis with respect to which the at least two pivot bearings, which are displaceably coupled, are displaceable with respect to one another, a distance between the first pivot bearing and the second pivot bearing is variable,
the leg support module comprises
a carrier element, which is configured for coupling the leg support element with the transverse element, and a
fixation plate, which is configured for the leg support element to be mounted thereon,
the leg support element is connected to the fixation plate via the second pivot bearing,
the fixation plate is connected to the carrier element via the linear bearing,
the carrier element is connected to the transverse element via the first pivot bearing, and
the support surface is entirely movable along the translational axis of the linear bearing.

15. The flight passenger seating device of claim 14, wherein the leg support element provides a support surface that is configured to allow a passenger sitting on the flight passenger seat in at least one position of the leg support element to rest his or her leg and/or foot thereon.

* * * * *